United States Patent [19]
Hoffman

[11] Patent Number: 6,099,674
[45] Date of Patent: Aug. 8, 2000

[54] LAMINATED PACKAGE AND METHOD OF PRODUCING THE SAME

[75] Inventor: Roger P. Hoffman, Green Bay, Wis.

[73] Assignee: Hoffman Environmental Systems, Inc., Green Bay, Wis.

[21] Appl. No.: 09/205,506

[22] Filed: Dec. 3, 1998

Related U.S. Application Data

[62] Division of application No. 08/579,219, Dec. 28, 1995, Pat. No. 5,882,746.

[51] Int. Cl.$^7$ .......................... B29C 53/00; B32B 31/18; B65B 21/00
[52] U.S. Cl. .......................... 156/217; 156/256; 156/258; 156/269; 156/277; 493/55; 493/56; 493/110; 493/114; 53/48.1; 53/467
[58] Field of Search ...................... 156/258, 269, 156/270, 277, 278, 279, 324, 325, 217, 256; 493/55, 56, 110, 114, 309; 53/48.1, 467

[56] References Cited

U.S. PATENT DOCUMENTS

| | | | |
|---|---|---|---|
| 3,603,218 | 9/1971 | Ludder | 493/55 |
| 3,802,984 | 4/1974 | Brugh, Jr. et al. | 156/324 |
| 3,804,656 | 4/1974 | Kaliski et al. | 106/487 |
| 4,237,206 | 12/1980 | Fujita | 430/11 |
| 4,826,714 | 5/1989 | King | 428/34.2 |
| 4,898,752 | 2/1990 | Cavagna et al. | 427/265 |
| 4,957,578 | 9/1990 | Huffman et al. | 156/244.11 |
| 5,011,741 | 4/1991 | Hoffman | 428/534 |
| 5,038,997 | 8/1991 | St. Charles | 229/5.81 |
| 5,147,507 | 9/1992 | Gill | 162/158 |
| 5,222,660 | 6/1993 | Koss | 222/231 |
| 5,324,383 | 6/1994 | Lang | 156/470 |
| 5,328,091 | 7/1994 | Kess | 493/114 |
| 5,415,340 | 5/1995 | Calvert et al. | 229/5.84 |
| 5,458,723 | 10/1995 | Watkins et al. | 156/310 |
| 5,772,819 | 6/1998 | Olvey | 156/272.6 |
| 5,882,746 | 3/1999 | Hoffman | 428/34.2 |

*Primary Examiner*—Rena L. Dye
*Attorney, Agent, or Firm*—Philip M. Weiss; Weiss & Weiss

[57] ABSTRACT

A laminated paperboard package is produced by initially printing graphics by high speed printing on a sheet of clay-coated publication paper. The printed paper is then continuously applied to a surface of cellulosic substrate and bonded to the substrate, preferably through use of starch as an adhesive, to provide a laminated product. The laminated product is then die cut to the desired shape, folded and glued into the configuration of a box or container. A layer of water absorbent, cellulosic fiber material can be bonded to the inner surface of the substrate to prevent moisture from the contained product from seeping outwardly through the substrate to the printed paper.

15 Claims, No Drawings

LAMINATED PACKAGE AND METHOD OF PRODUCING THE SAME

This is a division of application Ser. No. 08/579,219, filed Dec. 28, 1995 now U.S. Pat. No. 5,882,746.

BACKGROUND OF THE INVENTION

In recent years with the advent of mega-retailers and mass merchandizing, packaging has rapidly evolved. Today, more than ever, packaging is an extension of the marketing effort and product differentiation is often more important than the product itself. Thus product differentiation through enhanced printed graphics on the packaging is critical.

In the paper industry, the term "paperboard" is generally considered to include container board, such as corrugated boxes and linerboard, as well as boxboard, which includes beverage carriers, cereal boxes, milk cartons, small folded boxes, and the like. It has been recognized that sharp, precise graphics cannot be obtained when printing directly on paperboard products, due to the fact that the paperboard printing surface is relatively rough or uneven, as compared with clay coated paper. Further, paperboard normally has a grey or brown color, and printing directly on the darker color of the paperboard will tend to distract from the resolution of the graphs. To meet the demand for improved graphics, there have been attempts to use white packaging substrates produced from bleached pulp. While the white substrates provide enhanced printing surfaces, as compared with the normal brown and grey paperboard, the white paperboard is considerably more costly to produce and lacks the strength of an unbleached pulp substrate. Further, paperboard is relatively thick as compared to publication paper and cannot be printed through use of the modern high speed printing processes that are used for paper printing.

Beverage carrier, which is a type of paperboard, is designed to contain beverage cans in six-packs, twelve-packs, cases, or the like. As the beverage cans have considerable weight, it is important that the beverage carrier have high tear strength. The typical beverage carrier is a two-ply product, generally consisting of a base ply of virgin Kraft formed from long soft wood fibers, which provide the increased tear strength, and an outer or top ply, generally formed of shorter fiber hardwood. The top ply typically receives a clay coating and graphics are then printed on the clay coated top ply. The printed sheet is then die-cut into sections and each section is folded and glued into the shape of a box or container to subsequently receive the beverage cans.

Due to the relatively rough surface of the coated paperboard, as compared to clay coated paper, the printed graphics do not have the fine or sharp resolution compared to graphics printed on paper. Further, it is difficult to produce the clay coated paperboard. Because of the dark color of the substrate, the clay coating must be thick enough to mask the color, but if the clay coating is too thick, it may crack and adversely effect the printed graphics.

A further problem in the production of beverage carrier is that the printing cannot be done on high speed web offset presses as with paper, so that less sophisticated, lower speed printing equipment must be employed.

Thus, there has been a distinct need for paperboard packaging having enhanced graphics.

SUMMARY OF THE INVENTION

The invention is directed to a laminated paperboard package having enhanced graphics and to a method of producing the same. In accordance with the invention, a sheet of clay-coated or super calendered publication paper is printed with graphics, preferably by a high speed web offset printer. The printed sheet is then wound in coil form and stored for subsequent application to a cellulosic substrate. When producing beverage carrier, the cellulosic substrate preferably consists of one or more plies of unbleached virgin Kraft pulp, while when producing a product such as cereal box, the cellulosic substrate can be formed of one or more plies of recycled fibers.

At the box manufacturing site, the coiled printed paper is unwound and continuously applied to a surface of the moving cellulosic substrate and bonded to the substrate by an adhesive, which preferably takes the form of hydrolyzed starch, to thereby provide a laminated product.

The printed publication paper is relatively thin, having a thickness generally in the range of 0.00075 inch to 0.000200 inch, and as the thin layer of starch adhesive is relatively translucent, the dark colored cellulosic substrate may show through the printed paper, thus detracting from the appearance of the graphics. To prevent "show-through", finely divided particles of a generally inert white pigment, such as calcium carbonate or titanium dioxide can be incorporated in the starch adhesive, or alternately, a second clay coat can be applied to the undersurface of the paper prior to bonding the paper to the substrate.

After application of the printed paper to the cellulosic substrate, the laminated product is then die cut into a plurality of sections or segments of desired shape and each section is then folded and glued to form the configuration of a box. The boxes, in flat folded shape, are shipped to the manufacturer of the product, the boxes are then opened, the product inserted and the end flaps are then glued or secured to provide the final packaged product for distribution.

In certain instances when dealing with beverage carrier, the beverage cans may be introduced into the laminated box in a refrigerated state. Subsequently moisture may condense on the refrigerated cans, which can cause warping or disfiguration of the laminated box. To overcome this problem, a layer of water absorbent, cellulosic material, such as Kraft paper, corrugated medium, or newsprint can be applied to the inner surface of the cellulosic substrate prior to cutting and folding of the laminated sheet. The water absorbent cellulosic layer is applied to the inner surface of the substrate through use of a water resistant adhesive. The water absorbent layer will absorb any moisture which may condense on the cans contained within the package to prevent warping of the laminated package.

The invention provides enhanced graphics for paperboard packaging by use of high speed printing on publication paper, which is then bonded to the cellulosic substrate through an adhesive which preferably takes the form of hydrolyzed starch.

DESCRIPTION OF THE PREFERRED EMBODIMENT

The invention is directed in general to a laminated printed package consisting of a cellulosic substrate having a sheet of publication paper printed with graphics applied to the outer surface of the substrate through use of an adhesive, which preferably takes the form of starch.

The paper sheet to be used in the invention, is preferably clay coated publication paper which has a thickness generally in the range of 0.00075 inch to 0.00200 inch. More particularly, the paper can consist of clay coated ground wood paper produced by mechanical pulping operations. In addition, clay coated free sheet paper produced by chemical pulping operations, or super-calendared paper, or clay-coated newsprint can be utilized.

The paper in coiled form is unwound and printed by conventional techniques, preferably by high speed, offset printing, operating at a speed generally in the range of 1500 to 3200 ft. per minute. Alternately, high speed rotogravure printing can be utilized to print the graphics on the clay-coated or smooth surface of the paper. After printing, the paper is rewound into coiled form and stored for subsequent application to a cellulosic substrate at the location of the box manufacturer.

The cellulosic substrate can be produced by conventional procedures and can consist of unbleached virgin Kraft pulp, recycled pulp produced from old corrugated containers, newsprint, white office waste, and the like, or mixtures or virgin pulp and recycled pulp. The substrate is produced in one or more plies and generally has a basis weight of 40 lbs. to 90 lbs. per 1,000 sq. ft., and a thickness of 0.012 to 0.025 inches. When producing beverage carrier, where high tear strength is required in the laminated product, long fiber, virgin soft wood pulp is preferred as the base layer of the substrate, and an outer or top ply of finer fiber hardwood pulp can be applied to the base ply. When producing a laminated product that is designed to contain products of lesser weight, such as cereal boxes, milk cartons, or the like, the substrate can be formed of one or more plies of recycled pulp, produced from old corrugated cartons, newsprint, office waste, and the like.

The cellulosic substrate, when producing a high strength product such as beverage carrier, can be produced by a typical Kraft process, in which wood chips are cooked at a temperature of approximately 340° F. with the addition of sodium hydroxide and sodium hydrosulfide (conventional Kraft white liquor) for a period of about 20 to 60 minutes to dissolve the lignin and hemicellulose. After cooking, the pulp is washed which acts to remove up to 98% of the treating chemicals. The pulp is then diluted with water to a solids content of about 4% and treated with sulfuric acid and alum to obtain the desired pH. The pulp stock is then delivered to the headbox of the forming section of the papermaking machine, and the pulp slurry is fed from the headbox onto the forming fabric to provide a pulp mat.

Water is removed from the pulp mat by both gravity and mechanical induced vacuum, and the partially dewatered pulp then passes through the press section and drying section of the papermaking machine, in a conventional manner, to produce the dry cellulosic substrate.

If the substrate consists of multiple plies, the pulp for each additional ply is fed from a second headbox located downstream of the first headbox onto the base ply to provide the composite structure in a conventional manner.

When producing paperboard packaging, such as cereal box, the cellulosic substrate will generally consist of multiple plies of recycled fibers. The pulping of the recycled fibers is carried out in a conventional manner, in which the recycled cellulosic waste is mixed with water and chemical dispersants, such as sodium hydroxide. The mixture is then subjected to a shear type of pulping agitation to break down the cellulosic waste into individual fibers and to liberate inks and toners. During pulping the dispersant chemicals act to dissociate the ink from the fibers, and disperse the ink particles in the aqueous pulp slurry. Following the dispersion, the pulp can then be subjected to conventional ink removal operations, which can be accomplished either by froth floatation or dilution washing.

When utilizing virgin unbleached Kraft pulp, the cellulosic substrate will be brown in color, while the substrate formed from recycled materials will generally be a grey color.

At the site of the box manufacturer, the printed paper is uncoiled, and continuously bonded to the moving sheet of the cellulosic substrate through use of an adhesive which preferably takes the form of hydrolyzed starch. The starch to be used is preferably an amphoteric waxy maze-type, such as sold under the designation CAT0225 by National Starch Company. The starch is hydrolyzed or cooked, preferably by a conventional steam injector which heat and hydrolyses the starch.

In practice, the substrate is generally heated to a temperature in the range of 150° F. to 200° F. and the adhesive is preferably applied to the undersurface of the paper by a gate roll size press, or a metering blade. The paper with the adhesive on its undersurface is then applied to the upper surface of the cellulosic substrate to provide a laminated product which is passed through compression rolls to firmly bond the printed paper to the substrate.

The use of starch as the adhesive has distinct advantages. Initially, the starch has advantages from an ecological standpoint in that there are no hazardous emissions, as can occur when using a solvent-base adhesive. Further, it is believed that the starch, being impregnated into the outer face of the cellulose substrate, will increase the dry strength of the substrate.

In the laminated product, the printed paper extends over the entire surface area of the substrate. The laminated product is then die cut into a plurality of sections or segments of the desired shape or configuration. Each section is then folded and glued to form an open-ended box-like structure, and the flat boxes are then shipped to the manufacturer of the product to be contained. At the site of the product manufacturer, the flat boxes are opened, the product inserted, and the end flaps are then glued to provide the final packaged product that can be sent for distribution.

In certain instances, the items, such as beverage cans, inserted into the laminated package may be cold or refrigerated, and in this case, moisture may condense on the cans. It has been found that the condensed moisture may tend to warp or disfigure the laminated package. To overcome this problem, a layer of water absorbent Kraft paper, corrugated medium or newsprint, can be applied to the inner surface of the cellulose substrate or base layer, through use of a water resistant adhesive which can take the form of an epoxy resin, urea formaldehyde resin, or the like. Any moisture condensing on the refrigerated cans will be absorbed in the inner layer of cellulosic material and will not migrate through the laminated package due to the barrier created by the water resistant adhesive, thus eliminating warping or other disfigurement of the package.

It is also contemplated that in certain instances, a layer or film of water resistant material, such as polyethylene film, can be applied to the inner face of the cellulosic substrate prior to cutting and folding of the laminated material. The water resistant film will prevent migration of water or moisture through the laminated package to aid in minimizing any warpage or disfigurement of the package.

The publication paper is very thin and tends to be translucent. Similarly, the layer of starch adhesive is translucent, with the result that there may be "showthrough" of the dark colored cellulosic substrate which could detract from the appearance of the printed graphics. To prevent "showthrough", finely divided particles of a generally inert pigment, such as calcium carbonate, titanium dioxide, or the like, can be incorporated with the starch. Alternately, "show-through" can be prevented by applying a second coating of clay to the undersurface of the paper, the undersurface being the surface of the paper adjacent the cellulosic substrate. These constructions will prevent "show-through" of dark colored substrate and maintain the fine resolution of the graphics.

The invention combines the strength of the publishing business with the need for enhanced graphics in packaging, by laminating printed rolls of paper to a heavier weight cellulosic substrate, immediately preceding the die cutting, folding and gluing process.

I claim:

1. In a method of producing a laminated package, the steps comprising producing a dry base layer of cellulosic fibers containing a mixture of recycled and virgin pulp producing a sheet of paper having a smooth printable first surface, printing graphics on the smooth printable first surface of said paper sheet, continually moving the base layer in a path of travel, continuously applying the printed paper sheet to a first surface of said moving base layer while applying adhesive between contiguous surfaces of said moving base layer and said printed paper sheet to bond the printed paper to said moving base layer and produce a laminated structure with said printed sheet being bonded to substantially the entire surface area of the base layer, cutting the laminated structure into segments and forming each segment into the configuration of a box with said printed paper sheet constituting an outer face of the box.

2. The method of claim 1, wherein said base layer is produced from virgin Kraft pulp.

3. The method of claim 1, wherein said base layer is produced from recycled cellulosic pulp.

4. The method of claim 1, wherein said adhesive is starch.

5. The method of claim 4, and further including the step of incorporating a white-colored generally inert pigment with said starch.

6. The method of claim 4, and including the step of applying a clay coating to a second surface of said paper sheet prior to bonding the paper sheet to said base layer.

7. The method of claim 1, and further including the step of applying a water resistant coating to the inner surface of said base layer.

8. The method of claim 1, and including the further step of bonding a layer of water absorbent material to the inner surface of said base layer through use of a water resistant adhesive.

9. A method of producing a laminated beverage carrier, comprising the steps of producing a paper sheet having a smooth printable surface, separately producing a dry base layer of cellulosic fibers, printing graphics on the printable surface of said paper sheet, continuously applying the printed paper sheet to a first surface of said moving base layer while applying adhesive between the contiguous surface of said moving base layer and said printed paper sheet to bond the printed paper sheet to the moving base layer and produce a laminated structure with said printed paper sheet being bonded over substantially the entire surface area to the base layer, cutting the laminated structure into segments, forming each segment into the configuration of a box with the printed paper sheet constituting an outer face of the box, inserting a plurality of beverage containers into said box, and sealing the box.

10. The method of claim 9, wherein said paper sheet is generally translucent and said method includes the step of incorporating a white-colored generally inert pigment with said adhesive.

11. The method of claim 9, including the step of applying a clay coating to said paper sheet to produce said printable surface.

12. The method of claim 9, and including the step of moving the base layer continuously in a path of travel, applying the adhesive to the underside of the printed paper sheet, and applying compressive force to the laminated structure to bond the paper sheet to the base layer.

13. The method of claim 9, and including the step of applying a layer of water absorbent material on a second surface of said base layer with said water absorbent material constituting an inner face of the box, the step of introducing beverage containers into the box comprises introducing the containers into the box in a refrigerated state, and absorbing moisture condensing on said containers into said water absorbent layer.

14. A method of producing a laminated beverage carrier comprising the steps of producing a base layer of unbleached cellulosic fibers, producing a sheet of paper with a thickness in the range of 0.00075 to 0.00200 inches with a smooth printable surface thereon, printing graphics on the printable surface of said paper sheet to provide a printed paper sheet, continuously moving the base layer in a path of travel and applying the printed paper sheet to the a first surface of the moving base layer while applying an adhesive between contiguous surfaces of the base layer and the printed sheet to provide a laminated structure, applying a compressive force to the laminated structure to bond the paper sheet to the base layer, cutting the laminated structure into segments, forming each segment into a configuration of an open-ended box with said printed paper sheet constituting an outer face of the box, introducing beverage containers into the open end of the box and thereafter sealing the box.

15. The method of claim 9 wherein said dry base layer of cellulosic fibers contains a mixture of virgin and recycled pulp.

* * * * *